June 23, 1942.  A. VANG  2,287,540
SURFACE WELDING
Filed Aug. 12, 1940  2 Sheets-Sheet 1
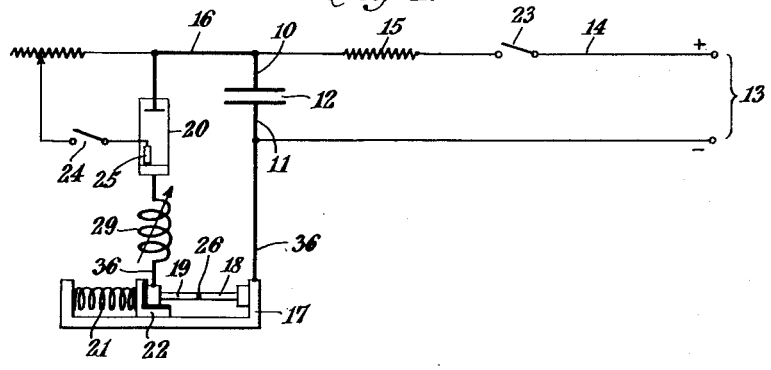
Fig. 1.
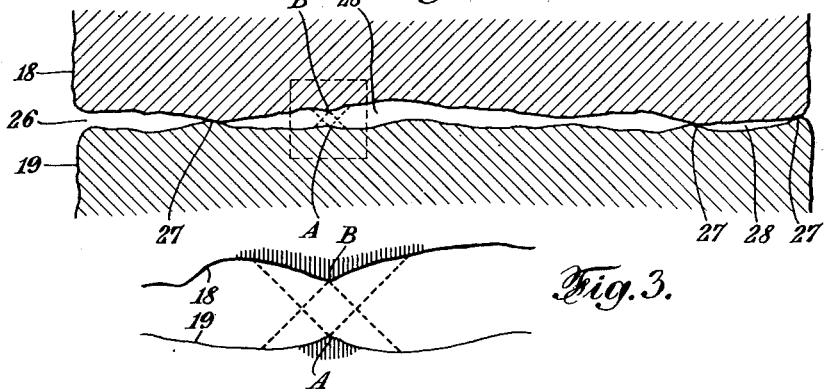
Fig. 2.
Fig. 3.
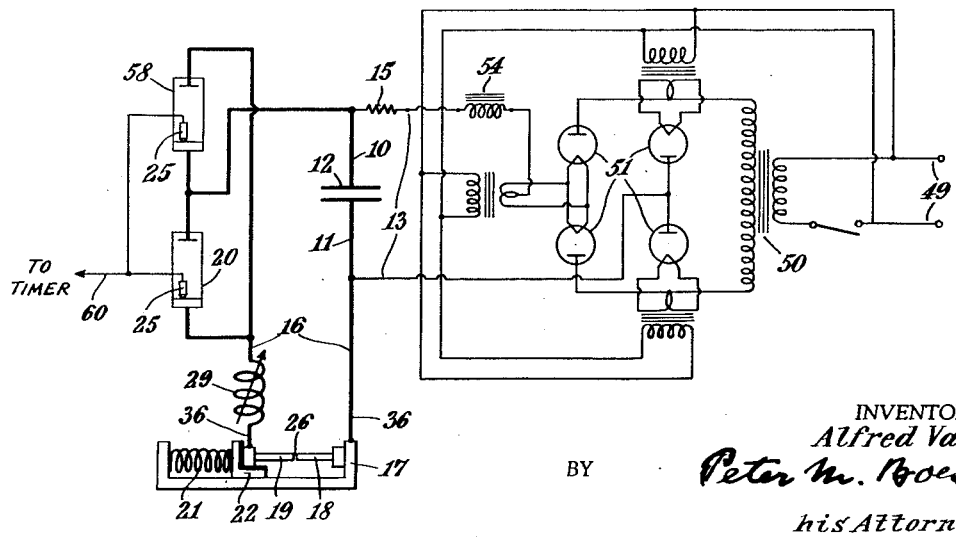
Fig. 4.
INVENTOR,
Alfred Vang
BY Peter M. Boesen
his Attorney.

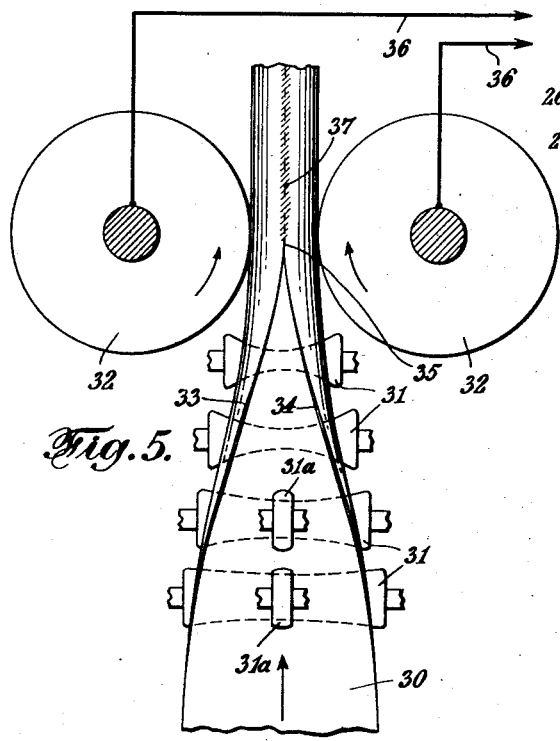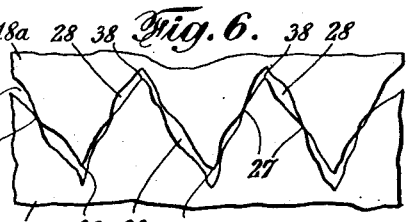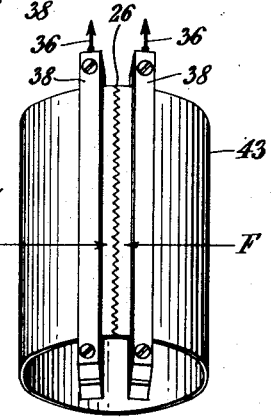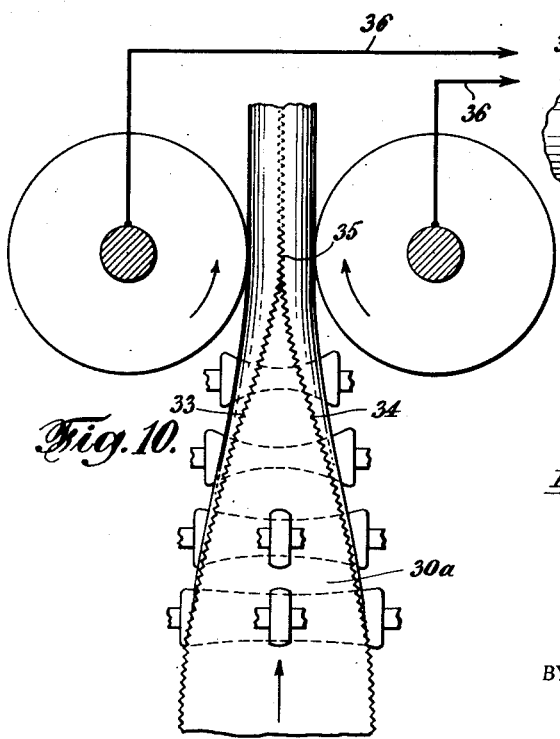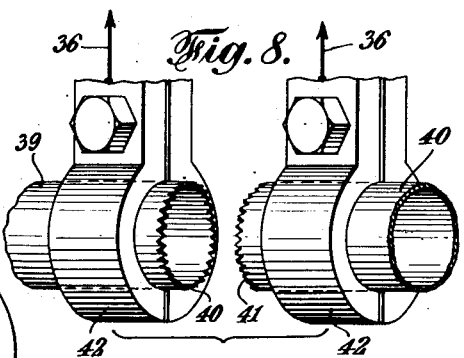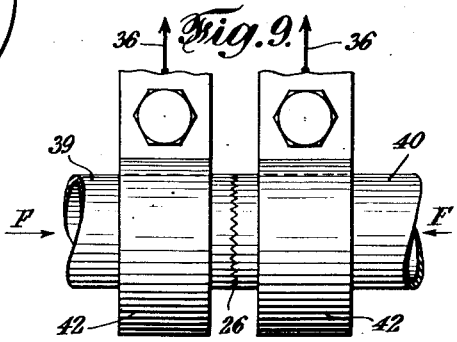

Patented June 23, 1942

2,287,540

UNITED STATES PATENT OFFICE 2,287,540

SURFACE WELDING

Alfred Vang, Detroit, Mich., assignor to Clayton Mark & Company, Evanston, Ill.

Application August 12, 1940, Serial No. 352,210

5 Claims. (Cl. 219—4)

This invention relates to processes for welding or fusing metallic junctures. More particularly, it relates to high voltage electric welding, to high frequency electric welding, and to a new process which I term "serration welding."

One object of the invention is to join dissimilar metals of widely different melting points or chemical activity.

Another object of the invention is to weld long or continuous seams in the production of such articles as cans or tubing, especially in cases heretofore considered difficult or impossible, as, for example, the joining edge-to-edge of very thin sheet metal, or of different metals, or of edges composed of various materials.

It is especially in relation to this object that the present invention differs from that described in my Patent Number 2,159,916. Both inventions subject the juncture to be welded to an oscillating electric discharge from a condenser previously charged at a high voltage. The above mentioned patent differs, however, in that percussive contact is required between the objects to be welded, the percussive motion serving as a switching means to discharge the condenser, as well as being a means for pressing the parts together.

In the present invention the ability of the electronic switch to handle heavy current at high voltage is taken advantage of to discharge the condenser through the juncture to be welded, thereby permitting previous engagement of the parts to be joined. This is especially advantageous in manufacturing operations which will not permit percussive movement, as, for example, the continuous forming of tubing. Pressure between the parts can be regulated independently by any convenient mechanical means, while close control of the current may be had through the use of properly designed electronic valves as switches, and through the proper proportioning of the circuit in cases where high frequency discharge is employed.

Another object of the invention is to minimize the heating of material adjacent to the weld. This I accomplish by the use of a very brief but very intense electric discharge, which generates a welding heat at the surfaces to be joined so quickly that the weld can be completed before an appreciable amount of the welding heat has had time to dissipate into the surrounding material. The weld is accomplished by two distinct processes during one and the same discharge: a resistance weld is accomplished wherever the metal is in contact across the juncture, and a flash weld is accomplished wherever an air gap or similar dielectric region exists within the juncture.

In some cases this does not require special preparation of the surfaces to be joined, but in other cases, for example, those in which the juncture is widely extended, or those in which the material to be joined is very thin, a special preparation of the surfaces is useful or necessary to secure an efficient distribution of the welding current in the shortest possible time. The nature of this preparation will be described as the specification proceeds.

Another object of the invention is to minimize or to eliminate the corrosion of parts being welded in air, by confining the welding heat very nearly to the actual surfaces to be joined, which surfaces of themselves are not readily accessible to the air, and also by performing the weld in so short a time as to minimize the corrosion of any parts thereof which may be exposed to the air. This absence of corrosion from my welds is in many cases so complete as to render the use of a special reducing atmosphere unnecessary, and often to permit the welding in air of materials which are customarily welded in an atmosphere of inert gas.

Another object of the invention is to minimize or eliminate the production of "flash," or metal which is customarily extruded from the welded juncture by pressing the parts together in excess of the amount required for the elimination of air pockets, for the purpose of carrying oxidied metal clear of the weld. According to my invention the metal within the weld is prevented from oxidizing by the extreme speed of the operation, by the intense heat, and by a self-cleaning action to be hereinafter described, and therefore the only flash which need be produced is that which is mechanically inevitable in the pushing together of two pieces which do not fit each other exactly, in order to secure a perfect contact. The perfection of the preliminary fit is thus the factor which determines the amount of unavoidable flash, which in many cases may be so slight as not to require trimming, whereby I can eliminate a costly operation.

Another object of the invention is to improve the energy economy of welding by restricting the energy consumed very nearly to the actual juncture concerned.

A still further object of the invention is to increase the economy of production of welded objects by performing the weld in the shortest possible time, thereby permitting the production line to move rapidly.

Other objects and advantages of the invention will become apparent as the specification proceeds.

With the above and other objects in view, this invention consists in the novel combination and arrangements of parts hereinafter described in the representative embodiments, pointed out in the subjoined claims, and illustrated in the annexed drawings, wherein like parts are designated by the same characters throughout the several views.

In the drawings:

Figure 1 is a diagram showing the operation of a simple embodiment of my invention, for direct current welding.

Figure 2 is an enlarged section of a typical juncture to be welded.

Figure 3 is an enlargement of the dotted square, shown in Figure 2.

Figure 4 is a symbolic electric diagram illustrating another embodiment of my invention, for alternating current welding.

Figure 5 illustrates the application of my invention to the welding of tubing.

Figure 6 is an enlarged section of a typical prepared junction, according to my invention.

Figure 7 illustrates the welding of prepared sheet metal to form tubing.

Figure 8 illustrates the preparation of tubes for butt-welding.

Figure 9 illustrates the assembly of the tubes, shown in Figure 8, preparatory to butt-welding.

Figure 10 illustrates the formation of thin-walled tubing from prepared sheet metal.

Referring more particularly to the drawings, and to Figure 1, the terminals 10 and 11 of a condenser 12 are connected with a source 13 of high voltage through the charging circuit 14. A switch 23 and a resistor 15 are in the circuit for regulating the flow of current for charging the condenser 12. A second circuit 16, for discharging the condenser 12, includes an igniter tube 20, a variable inductance 29, and two pieces of metal to be welded, 18 and 19, held in the frame 17. The pieces 18 and 19 are held firmly together by pressure of a spring 21 against an insulated sliding part 22 of the clamping frame 17.

Closing the switch 23 allows the condenser 12 to charge to the high voltage of the source 13. The switch 23 may then be opened, and the switch 24 closed, causing the igniter electrode 25 to initiate ionization in the igniter tube 20, and thus permitting the condenser 12 to discharge through the juncture 26 between the pieces 18 and 19.

Referring now to Figure 2, the juncture 26 is shown enlarged and somewhat exaggerated as to irregularity.

The pieces 18 and 19 are rods with flat ends, pressed together. The flatness of the ends, however, can never be expected to be perfect. Therefore, the contacting regions 27 will always be interspersed with non-contacting regions, or air pockets 28. This is especially marked when the pressure between the pieces 18 and 19 is not great enough to upset them, but still persists at almost any pressure so long as the pieces are cold.

The spaces 28, being filled with dielectric material, usually gaseous, may be considered as spark gaps which are short-circuited by the regions of contact 27. However, the regions of contact 27 are of very small area relative to the area of the section of the pieces 18 and 19, and hence have very high resistance relative to the latter. Therefore, a discharge from a low impedance source charged at high potential can build up a high potential difference across the "bottle-neck" resistance of the regions of contact 27. The voltage thus maintained can be enough to break down the dielectric in the gap 28. Thus the gaps 28 will be bridge by an arc, when the high-voltage circuit 16 of which the impedance is sufficiently low relative to the resistance of the juncture 26, and the voltage sufficiently high, is closed, to maintain momentarily a potential difference across the juncture equal to or greater than the breakdown potential of the dielectric in the spaces 28.

The exact value of the voltage necessary across the juncture, in any particular case, to bridge the gaps and thus to perform a weld according to my invention, will depend upon the perfection of the fitting of the pieces to be joined, upon the nature of the materials and upon the perfection required in the finished juncture. In general, it may be said that 500 volts is an approximate minimum figure.

The required voltage of the source to maintain the said 500 volts across the juncture will, in general, be much higher, because of inevitable circuit losses. The circuit losses are so variable, that it is even more difficult to set in advance the exact value for the source, or limiting values therefor, but I have found in practice that the required value is almost always in excess of 1000 volts.

The success of my invention depends partly upon the speed with which an electric potential difference between the pieces 18 and 19 can be built up and reduced.

The speed required is so great, and the time of application so small as to render standard switching means inadequate to perform my process. My invention thus belongs in the class of high-frequency or ultra-high-frequency apparatus. Therefore, it is the high frequency impedance of the circuit 16 which must be made low relative to the resistance of the juncture 26, rather than the direct current resistance alone, which may be virtually infinite at the condenser 12. Also, it is necessary that the greater part of the impedance of the switching means 20 be reduced in a very short time, preferably in the order of micro-seconds, in order to prevent the welding energy from being dissipated within the switching means itself instead of in the juncture to be welded. This speed is provided by the action of the igniter electrode 25, which need not be described here, as igniter tubes are now well known in the art. It is sufficient to say that the ignition-controlled mercury-cathode tube, herein called igniter tube, is one form of switching means capable of closing the circuit 16 rapidly enough, and of handling enough power, to perform a practical weld according to my invention.

Referring again to Figure 2, the gap 28 will be bridged by an arc wherever the potential difference between the pieces 18 and 19 is sufficient to break down the intervening dielectric. It is my intention that the voltage should be high enough to break through the dielectric at even the widest parts thereof, although such may not always be the case. The walls of the spaces 28 will be melted or vaporized by the arc formed therein, to a depth which will depend upon the time allowed for the conduction of heat into the pieces 18 and 19. Also, the contacting regions 27 will be similarly melted or vaporized by the heat formed therein by conduction of current through their relatively high resistance. The distribution of heat throughout the juncture tends to improve as the weld progresses, for at elevated temperatures the initial resistance of the contacting regions in general increases, while the resistance of the dielectric regions in general decreases. At the same time the chance of air inclusion in the final weld is being eliminated by the generation of metal vapor, which tends to drive out the air by replacing it. Meanwhile, the pieces 18 and 19 are being mechanically pressed together by the spring 21, which tends to obliterate the air spaces 28 as soon as the contacting regions 27 have become softened, permitting the melted walls of the spaces 28 to come together and to adhere to one another.

It is preferable that the apparatus shall be so adjusted that a sufficient amount of the charge of the condenser 12 shall have passed through the junction 26 by this time so that further and unnecessary heating of the parts 18 and 19 shall be avoided and the weld be complete.

The fact that air or other gas initially filling the spaces 28 is driven out at an early stage of the welding process is of great importance in eliminating the oxidation of the materials to be joined. Thus, while other, slower welding processes tend to oxidize the surfaces to be joined, and thus necessitate the extension of the heated area to provide the extrusion of a relatively large amount of metal from the weld in order to secure a clean joining, my process is inherently self-cleaning in several ways. First, I confine the welding heat to the opposed surfaces, which are closely fitted together; and hence there is little or no opportunity for the circulation of air between the hot surfaces. Second, the production of metal vapor in the weld forces out the air which was initially there and maintains an outward flow which prevents other air from entering the zone of operation. Third, the extremely high temperature, near the vaporizing point of the metal being joined, has in many if not all cases a tendency to decompose oxides rather than to form them.

Because of this self-cleaning action my process permits the opposed surfaces to adhere strongly, with only the slightest extrusion of molten metal from the juncture, or in some cases with virtually none at all. This result in an obvious saving of time, power and material.

Since the conduction of heat by metals is slow relative to the rate at which heat is formed according to my invention, and because nearly all the heat is generated within the actual juncture 26, it is possible to regulate the depth of penetration of welding temperature into the pieces 18 and 19. If, for example, it is discovered in a sample weld that the air spaces 28 have not been completely obliterated, because the contacting regions 27 have not been softened to a depth sufficient to allow the pieces to come together properly, the inductance 29 can be adjusted to a higher value, which will lower the fundamental frequency of the circuit 16, allowing a greater time for conduction of the welding heat into the pieces 18 and 19. The condenser 12 would then have to be charged to a higher potential in order to keep the potential drop across the pieces 18 and 19 at the original value, and to furnish the additional energy required to heat the metal to a greater depth.

While I have spoken of the fundamental frequency of the circuit 16, I wish to point out that the igniter tube 20 is essentially a one-way conductor, and, therefore, I am in this embodiment dealing with only the first half-cycle of a discharge which would otherwise be oscillating. In another embodiment, which I shall describe presently, the discharge is permitted to oscillate for one or more complete cycles.

The joining of dissimilar materials can be accomplished by my invention as readily, or nearly as readily, as the joining of similar materials, or as the welding of pieces having the same composition. This is mainly because of the sharp gradient of temperature in the material adjacent to the weld. The time required for the discharge to melt or vaporize the surfaces to be joined is so short, that even the best thermal conductors will not have time to conduct the welding heat into the main body of the metal, hence the melted juncture is always held together by a wall of the original cold or nearly cold metal only a few thousandths of an inch away. Thus I can join a metal having a low melting point with one having a high melting point, as magnesium with cast iron, using a strong pressure, if desired, and I can melt or vaporize the surfaces of both, while doing so, thereby attaining a very strong union.

If this is attempted by conventional, slower methods which allow time for the spreading of heat into the materials being joined, the metal having the lower melting point will ordinarily collapse before the weld is complete. Also, the process will be complicated by difference between the resistances of the pieces being joined. By contrast, my process, because of its extreme rapidity, tends to emphasize the relatively high juncture resistance regardless of the resistance of the parts themselves.

The joining of dissimilar materials is also aided by the self-cleaning non-oxidizing feature of my process. Where conventional methods fail because one metal becomes heavily oxidized before a mutual welding temperature is attained, or where a flux normally used with one metal is incompatible with the other, my method avoids these difficulties by driving out the corrosive gases, and no flux is necessary.

Referring to Figure 4, alternating current from the supply mains 49 is transformed to a high voltage by the transformer 50 and rectified by the tubes 51, which are protected by a choke 54, forming a source 13 of high voltage direct current. This source may, of course, be replaced by any other suitable source of high voltage direct current.

Direct current from the source 13 is led into the condenser 12 through the resistor 15, as was the case in Figure 1. The discharge circuit 16 of the condenser 12 is the same as in Figure 1, with the exception that an additional igniter tube 58 has been included, in parallel with the tube 20 but reversed in direction, thus permitting current to traverse the circuit 16 in either direction. This is of utility in cases where it is difficult to distribute the current over a large weld, for it has been observed that the discharge across an air gap tends to extend from a point on the negative side to a relatively large area on the positive side. This is illustrated in Figure 3, where dotted lines extending from a point A on the piece 19 to a relatively wide portion of the surface of the piece 18 show the shape which an arc tends to assume, where 19 is negative with respect to 18. The are tends to heat the positive side 18 over a wide area but tends only to dig a crater in the negative side 19, as shown by the shaded areas in Figure 3, thus causing uneven distribution of heat on that side even though a large number of arcs may be formed simultaneously. Reversal of polarity causes a reversal of the arc shapes, so that new arcs are formed tending to cover large areas on the side which was previously covered only with scattered craters. The reversed arc shape is indicated by dotted lines extending from B on 18 to a large area on 19.

Hence areas on both sides can be treated with the arc discharge if the direction of the current is reversed frequently during the welding operation, and thus the surfaces can be prepared for joining in a shorter time and with less heat penetration where an oscillating discharge is used, as it is not necessary to wait for some parts of the juncture to be heated by conduction. Other advantages are: that all the energy of the condenser charge can be used, if it is desired to do so, making it unnecessary to waste the energy of the reserve charge left in the condenser of the circuit illustrated in Figure 1 after a weld has been performed; and that with proper timing connections to the igniter electrodes 25, through the timing lead 60, the welding operation can in some cases be stopped, if desired, before the condenser 12 has been completely discharged, or possibly several small welds could be performed one after another by a single charge of a large condenser. In some cases, where the frequency is not too high, other switching arrangements can be made to insure the stopping of the oscillations with the polarity of the condenser always in the same direction, which would permit the condenser to commence recharging immediately after the discharge without loss of time or energy.

While I have thus illustrated representative embodiments of my invention with a current supply including a condenser and igniter tubes, I wish to point out that other types of current supply may be used, and that the part of my invention concerning the welding process itself is not limited in its application to use with the circuits described.

Figure 5 illustrates the application of my invention to the welding of metal tubing, as a step in the formation thereof from sheet metal. The sheet 30 is rolled into a tube in the conventional manner with the assistance of the rolls 31, 31a and 32. Junction of the approaching edges 33 and 34 occurs at a point 35 approximately half way between the centers of the rolls 32.

The rolls 32 are insulated from the remainder of the machinery except from the sheet 30, and they are connected electrically with the welding circuit by heavy leads, indicated diagrammatically by the lines 36, 36. Thus any circuit including the leads 36 will also include the sheet 30, both at the junction point 35, and through the back of the newly formed tubing, opposite the point 35.

If the leads 36 are connected with a powerful source of electric current at high voltage, while the sheet 30 is passing through a roll system, as described, the source will be short circuited by the back of the sheet 30, but if the source is of sufficiently low impedance there can still be sufficient potential difference between the edges 33 and 34, at the point 35 to perform a weld according to my invention.

The portion of the juncture already welded, indicated by the shaded area 37, forms a barrier of relatively high resistance to the discharge, because of the temperature of the metal therein, while the wide air gap between the edges 33 and 34 before they come together forms another high resistance barrier to the passage of current.

Thus, the portion of current which traverses the side of the tubing to be joined will be confined largely to the vicinity of the point 35, where a weld will take place, as described in connection with the Figures 1 to 4. According to my invention, the voltage between the edges 33 and 34 in the vicinity of the point 35 will be high enough to jump the gap shortly before it is closed, preparing the edges 33 and 34 for joining by melting the surfaces thereof, which are pressed together as the tube is closed by the rolls 32.

The current supply to the leads 36 may be intermittent, as from the circuit 16, shown in Figure 1, or as in Figure 4, having impulses coming at intervals short enough to assure the overlapping of the "stitches," or, in the case of extremely rapid production, the current may be continuous, and may then be taken directly from any extremely powerful high voltage source. In that case the distinction between my invention and conventional resistance welds taking current directly from a generator lies in the fact that according to my invention the generator must be powerful enough and of sufficiently low resistance to maintain a relatively high voltage between the opposing edges 33 and 34 in order to form an arc between them.

In the case of very long and extended junctures to be welded by a single discharge it may be advantageous or necessary to resort to a special preparation of the surfaces to be joined, as mentioned previously, in order to cause the discharge to spread at once uniformly and efficiently over the juncture so that all parts of the surfaces to be joined may be heated simultaneously, quickly and briefly. The preparation comprises the formation of many teeth or serrations in the surfaces to be joined. These serrations are preferably matched with others in the opposing surface, and they are preferably sharp or pointed. The serrated edges are fitted together, and then the weld is performed in the same way as with an unserrated juncture.

Figure 6 represents an enlargement of a serrated juncture fitted together, with surface irregularities somewhat exaggerated. The points 38 facilitate the initiation of arcs at regular intervals, for, as is well known, dielectric strain is greatest near that point on the surface of a conductor, which has the sharpest curvature, all other things being equal. Hence the points assure that no very large region shall lack immediate generation of heat through breakdown of the dielectric, without waiting for the pieces 18a and 19a to come closer as other projections melt, as they either ionize the spaces 28 to initiate a discharge, or, if their mechanical shape causes them to touch the opposite side, they initiate a resistance weld at that spot.

If is, of course, not absolutely necessary that the serrations be fitted together exactly, or be mutually matching, or of the same size, or on both pieces, but the condition described is preferable to avoid excessive flash, or extruded metal in the finished juncture.

The optimum size for the serrations depends upon many factors, which include the thickness of the material, its physical and chemical nature, and the degree of mechanical perfection attained in the formation of the opposed surfaces. Thus the formation of serrations is an extension in size and regularity of the haphazard formation of microscopic irregularities in the ordinary preparation or fitting together of surfaces to be welded. The size and location of the serrations should be designed to procure the operation on a large scale of the same factors described previously as operating on a microscopic scale.

Figure 7 represents, diagrammatically, a piece of thin sheet metal 43 provided with serrations on opposite edges, and bent in a circle and assembled with electrodes, to be welded to form the body of a can. The electrodes 38 are of very heavy section relative to that of the can, and are clamped firmly close to the seam to be welded.

They serve to distribute the welding potential relatively uniformly along either side of the serrated juncture 26. Some current will be wasted in traversing the back of the sheet, as was the case in the tube of Figure 5, but the heat produced by that current will cause only a relatively small temperature rise, as it will be distributed over the long rear loop of the sheet 43, while the heat of the current passing through the juncture will be concentrated at the juncture itself.

The serrations serve the purpose of distributing the welding current along the seam with substantial uniformity by utilizing the tendency of the high voltage welding current to flow through points, as described previously, thus minimizing any tendency which might otherwise be present of the welding current to flow heavily at one end of the seam and lightly at the other, because of varying contact conditions. While the welding current is flowing, the seam is being pressed together, as indicated by the arrows F, F, for completing the weld, as described, in connection with the Figures 1 to 4.

Figure 8 shows two pieces of tubing 39 and 40, prepared with serrated ends 40 and 41 for being welded end to end. They are held in the clamps 42, which are electrically connected with the discharge circuit through the leads 36, as shown diagrammatically.

Figure 9 shows the pieces 39 and 40 assembled for welding while under pressure, as indicated by the arrow F, F. Here again the serrations serve to assure the relatively uniform distribution of the high voltage welding current among the various portions of the juncture 26.

Figure 10 illustrates the formation of tubing from sheet metal in the same manner as shown in Figure 5 with the exception that the edges 33 and 34 of the sheet 30a are provided with serrations, as shown. Here the serrations facilitate the striking of a series of arcs between the edges 33 and 34 in the region in which they are approaching one another closely, just before the junction point 35. In this way the edges 33 and 34 can have the benefit of a greater ratio of arc heating to resistance heating than is the case with the non-serrated edges shown in Figure 5, and they can, therefore, be thermally better prepared for welding by the time they reach the point of contact 35. Also, in cases where the seam is welded in steps or "stitches" and where the serrations are small relative to the size of the steps the serrations will help to secure a uniform distribution of welding current in each step.

It is obvious that while specific examples of the invention have been herein set forth for descriptive purposes, it is not intended that said invention be precisely limited thereto, but that changes, variations, and modifications may be incorporated and embodied herein within the scope of the annexed claims.

I claim as my invention and desire to secure by Letters Patent:

1. An electric circuit for fusing a partially contacting juncture between conducting materials by means of a high frequency alternating current, said circuit consisting of materials held in partial contact for the fusing operation, electrodes for contacting said materials, a capacitor, means for charging said capacitor, and electronic switching means capable of passing a high frequency alternating current, said electrodes, capacitor and switching means being directly serially connected and so proportioned as to establish a high frequency alternating current upon discharge of said capacitor.

2. An electric device adapted to cause fusion of a partially contacting juncture between conducting materials by means of a strong high-frequency current of brief duration, consisting of a capacitor, means for charging said capacitor, electronic switching means capable of passing a heavy high frequency current, and electrodes for joining said capacitor and said switching means with the contacting materials to be welded, in a series circuit of high resonant frequency, whereby energy stored in said capacitor may be discharged into a juncture to be welded, thereby performing the weld.

3. A device adapted to fuse a juncture between conducting materials, said device including an electric circuit containing both inductance and capacitance directly serially connected with said materials, said materials being in partial contact for welding and forming part of the series connection, and electronic means serially connected in said circuit for initiating an oscillating electric current therein, said circuit having a high resonant frequency, whereby a welding heat will be generated substantially exclusively within the juncture between said materials.

4. An electric welding circuit having as elements, workpieces to be welded, said workpieces being in partial electrical contact, electrodes for contacting said workpieces, a capacitor and electronic switching means capable of passing an alternating current, said elements being in direct serial connection and having constants adjusted to establish a high frequency welding current upon discharge of said capacitor, whereby a welding heat of great intensity and brief duration is generated within the juncture between said workpieces.

5. An electric welding apparatus comprising means for holding workpieces in partial electrical contact, discharge means for heating the juncture between said pieces, said discharge means comprising a capacitor and a gaseous electronic discharge tube, means for charging the capacitor, means for initiating a discharge in said tube, and electrodes for connecting said discharge means directly with said workpieces forming therewith a high frequency discharge circuit, whereby said pieces may be joined by arcing within said juncture accompanied by only slight penetration of heat into the metal adjacent to the weld.

ALFRED VANG.